J. P. BROPHY.

INNER TUBE FOR PNEUMATIC TIRES.

APPLICATION FILED FEB. 8, 1917.

Reissued Dec. 10, 1918. 14,564.

Inventor
James P. Brophy
by Jas. H. Schmehill
Atty.

UNITED STATES PATENT OFFICE

JAMES P. BROPHY, OF BOSTON, MASSACHUSETTS, ASSIGNOR TO PNEUMATIC CUSHION INNER TUBE COMPANY, A CORPORATION OF MASSACHUSETTS.

INNER TUBE FOR PNEUMATIC TIRES.

14,564. Specification of Reissued Letters Patent. Reissued Dec. 10, 1918.

Original No. 1,208,906, dated December 19, 1916, Serial No. 88,318, filed April 1, 1916. Application for reissue filed February 8, 1917. Serial No. 147,497.

*To all whom it may concern:*

Be it known that I, JAMES P. BROPHY, a citizen of the United States, residing at Boston, in the county of Suffolk and State of Massachusetts, have invented an Improvement in Inner Tubes for Pneumatic Tires, of which the following description, in connection with the accompanying drawings, is a specification, like characters on the drawings representing like parts.

This invention relates to certain novel and useful improvements in inner tubes for pneumatic tires.

In carrying out the present invention, it is my purpose to provide an inner tube for pneumatic tires which will be constructed in such manner as to render the same practically puncture proof and which, in the event of the discharge of the air therefrom, will prevent the collapsing of the tire as a whole, thereby preventing mutilation of the tire and prolonging the life thereof when the tire is kept in service after the air has been exhausted therefrom.

With the above and other objects in view, the invention consists in the construction, combination and arrangement of parts hereinafter set forth in and falling within the scope of the claims.

Figure 1:
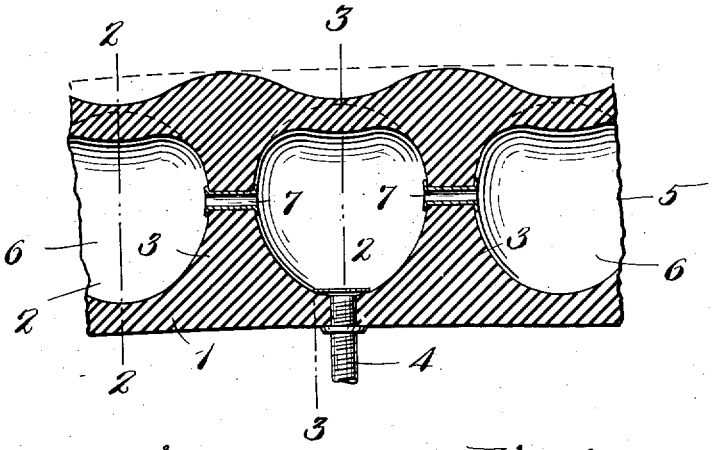
Figure 2:
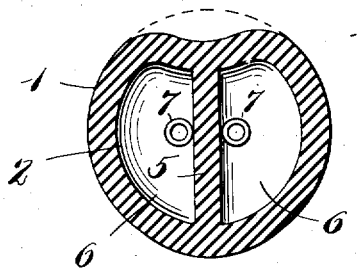
Figure 3:
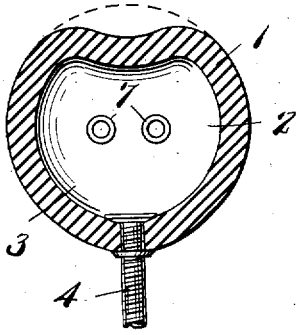

In the accompanying drawing: Figure 1 is a fragmentary longitudinal sectional view through an inner tube constructed in accordance with the present invention. Fig. 2 is a cross sectional view on the line 2—2 of Fig. 1. Fig. 3 is a similar view on the line 3—3 of Fig. 1.

Referring now to the drawing in detail, 1 designates an inner tube for pneumatic tires of the double tube type. In accordance with my present invention, the tube 1 is formed interiorly to provide a circular series of air chambers 2 separated from one another by means of solid walls 3 extended transversely with relation to the tube 1 and formed of the same material as the tube and connected to the tube 1, and opening into one of the chambers 2 is an air valve 4 whereby the tube may be inflated and deflated.

Some and preferably all of the chambers 2 with the exception of the chamber provided with the air valve, are divided by means of longitudinal partitions 5 into compartments 6 arranged side by side, and the compartments 6 on each side of the tire are in open communication with one another by means of metal tubes 7 passed through openings in the partitions 3, and the compartments 6 contiguous to the valve chamber are in open communication with the valve chamber by means of tubes 7.

The outer walls of the chambers may be normally concaved or depressed as illustrated in the drawing and when the tube is inflated, these walls are forced out as shown by the dotted lines in the drawing so that the outer circumference of the tube will present an unbroken tread.

When, however, one of the chambers or compartments is punctured at the outer wall, such wall retains its inflated position so as to prevent the escape of all the air from the chamber or compartment in the case of small or ordinary punctures.

It will be noted, that the walls of the chambers are relatively thick so as to reduce the possibility of puncture to a minimum, and should the tube be punctured, and the air released therefrom, the walls of the inner chambers and the compartments segregated from one another will act to hold the tube expanded to such extent as to prevent mutilation of the tire when the latter is used without air.

It will also be observed that the air chambers are formed within the tube 1 by a series of transverse walls 3, which are spaced apart and form the end walls of the air chambers 2 and further form transverse bulkheads or supporting walls to sustain the weight placed upon the tube, which weight is also sustained by the partition walls 5 extended circumferentially or longitudinally of the tube and located substantially in the plane of the tread portion of said tube so as to form longitudinal bulkheads or supporting walls for the chambers in which they are located, so that when the tube is inflated with air under pressure, the weight is carried by the air under pressure assisted by resilient bulkheads within the tube, and when the tube is deflated, the weight is carried by the resilient bulkheads within the tube, which are arranged therein so that the longitudinal and transverse bulkheads are presented edgewise to the ground.

It is preferred to provide each air chamber, except that with which the air valve 4 is connected, with the longitudinal partition wall or bulkhead 5, but it is not desired to limit the invention in this respect as the partition wall 5 may be omitted from some of said chambers distributed about the inner tube if it is desired to increase the pneumatic resiliency of the said inner tube, while providing for a sufficient number of longitudinal bulkheads within the tube to coöperate with the transverse bulkheads and sustain the weight placed upon the inner tube and prevent rim cutting or other injury to the outer shoe of the tire.

Claims:

1. An inner tube for pneumatic tires formed interiorly to provide an annular series of chambers, all of said chambers but one being divided longitudinally to form compartments arranged side by side, the compartments upon each side of the tire communicating with one another and with the other chamber, an inflation valve in the non-divided chamber, the outer walls of said chambers being normally concaved so that the rubber may be compressed upon the inflation of the tire to reduce the possibility of puncture.

2. An inner tube for pneumatic tires comprising a tube of resilient material provided with an air inlet and having within it a series of transverse walls united thereto and spaced apart to form air chambers and having some of said air chambers provided with longitudinally extended walls arranged substantially in the plane of the tread portion of said tube to present said walls edge on to the ground and to divide said chambers into compartments, said transverse walls having openings for connecting adjacent compartments on each side of the tire with one another and with said air inlet to enable said compartments to be inflated and deflated through said air inlet.

3. An inner tube for pneumatic tires comprising a tube of resilient material provided with an air inlet and having within and united to it in fixed relation thereto a plurality of transverse and longitudinally extended walls of resilient material which cooperate to form a series of bulkheads within said tube which are arranged with the longitudinal walls substantially in the plane of the tread portion of the said tube to present said longitudinal walls edge on to the ground, said transverse and longitudinal walls coöperating with said tube to form within the latter a plurality of air compartments, and means for establishing communication of said compartments on each side of the tire with one another and with said air inlet to enable said compartments to be inflated and deflated through said air inlet.

4. An inner tube for pneumatic tires comprising a tube of resilient material provided with an air inlet and having within it a plurality of diametrical partitions of resilient material extended longitudinally of the tube substantially in the plane of the tread portion of the latter and united with the inner wall of said tube at substantially diametrically opposite portions of said tube, and a plurality of transverse partitions of resilient material and of the internal diameter of the tube and spaced apart and coöperating with said longitudinally extended partitions to form air compartments within the tube on opposite sides of the longitudinally extended partitions, and means for establishing communication of said compartments on each side of the tire with one another and with said air inlet to enable said compartments to be inflated and deflated through said air inlet.

5. An inner tube for pneumatic tires, comprising a tube of resilient material formed interiorly to provide a series of transverse supporting walls of resilient material which are of the internal diameter of the tube and united therewith and spaced apart to form an annular series of air chambers within said tube, some of said chambers having longitudinal walls of resilient material substantially in the plane of the tread portion of said tube and united with the said tube at substantially diametrically opposite portions thereof to divide the said air chambers into compartments, one of said chambers having an air inlet communicating with the atmosphere to form an air inlet chamber, the compartments upon each side of the longitudinal walls communicating with one another and with said air inlet chamber to be inflated and deflated through the latter.

JAMES P. BROPHY.